L. M. BROWNING.
SELF ADJUSTING BEARING FOR PITMEN.
APPLICATION FILED AUG. 31, 1914.
1,151,339.
Patented Aug. 24, 1915.
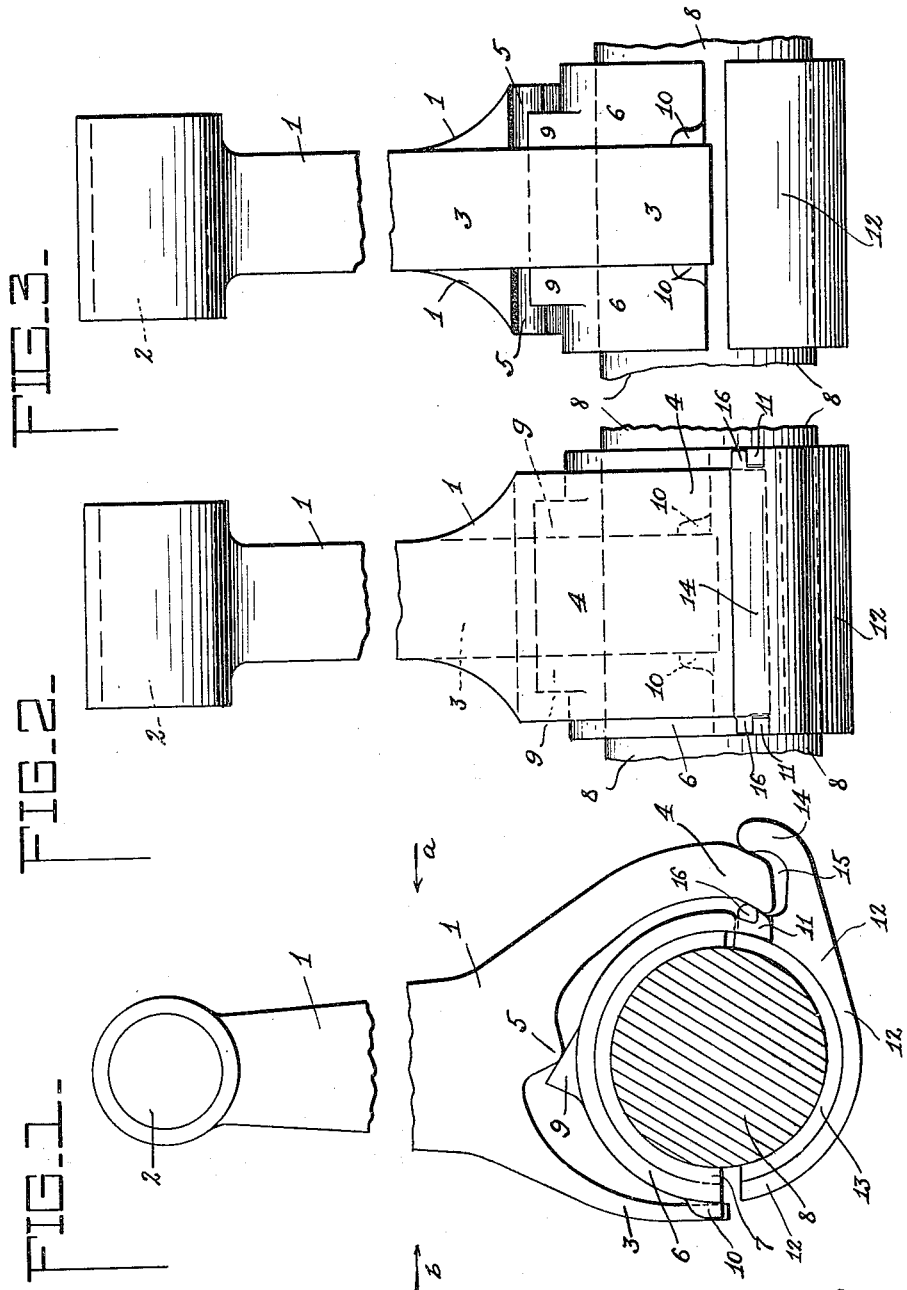

UNITED STATES PATENT OFFICE.

LEWIS M. BROWNING, OF BELMONT, NEW YORK.

SELF-ADJUSTING BEARING FOR PITMEN.

1,151,339.  Specification of Letters Patent.  Patented Aug. 24, 1915.

Application filed August 31, 1914. Serial No. 859,368.

*To all whom it may concern:*

Be it known that I, LEWIS M. BROWNING, a citizen of the United States, residing at Belmont, in the county of Allegany and State of New York, have invented certain new and useful Improvements in Self-Adjusting Bearings for Pitmen, of which the following is a specification.

My invention relates to a self adjusting bearing, which is particularly adapted for use in connection with pitmen or connecting rods applied between the crank shaft and pistons of a multi-cylinder internal combustion engine or other form of motors.

The objects of my invention are: First, to construct a self adjusting bearing which is simple in construction, embraces a minimum number of parts, easily assembled or applied, or taken apart for inspection, and capable of being produced and maintained at a low cost. Second, to construct a bearing which is free from all complicated constructions, will automatically and immediately take up all wear between the parts and readily adjust itself at all times and conditions of service. Third, to construct a self adjusting bearing of the type and advantages above stated, which is light in weight, while at the same time has a maximum of strength to resist the forces with which it is subjected while in operation. Fourth, other objects and advantages of operation will be apparent and fully understood from the following detailed description of the different parts and relation of said parts.

The invention consists of structural characteristics and relative arrangements of the different parts comprising the invention, which will be hereafter more fully described and particularly pointed out in the appended claims.

Referring to the drawings in which similar reference characters indicate the same parts in the several figures of the drawing, Figure 1 is an end elevation of a connecting rod provided with my improved form of self adjusting bearing. Fig. 2 is a view taken in the direction of the arrow *a* shown in Fig. 1. Fig 3 is a view taken in the direction of the arrow *b* shown in Fig. 1.

In the drawings, 1 is the connecting rod, which has been broken in sections to more clearly show the lower self adjusting bearing and my invention on a large scale. The upper end of the connecting rod 1, is provided with the usual opening or bearing 2, to engage a pin secured to a piston of a motor cylinder, not shown, and well understood and forming no part of the present invention. The lower end of the connecting rod 1, is so constructed and arranged as to have on one side a narrow depending projection 3, and on the other and opposite side of the rod 1, is a wider and jaw-like projection 4, as illustrated in Figs. 1 and 2. At the lower end of the rod 1 and between the projections 3 and 4, as shown in Fig. 1, is formed integrally therewith, a small wedge-shaped projection 5, for purposes to be presently described.

A curved upper bearing cap 6, separate and independent of the rod 1, and provided with the usual bushing 7, made fast thereto in the customary manner, is seated on, supported, or carried by the crank shaft 8. Said bearing cap 6, is so formed as to have a wedge-like projection 9, on its upper side, and arranged to have its right inclined side engage the lower edge of the projection 5, on rod 1.

10, 10 are separated lateral lugs extending from one end or side of the upper cap 6, adjacent to the projection 3 and adapted to receive the lower end of said depending projection 3, while the other side of the cap 6, is provided with the projections 11, 11, one on each edge as shown in Figs. 1 and 2, and for purposes to be presently described.

12 is a lower cap, which is provided with a bushing 13, similarly formed and connected to the cap 12, as that of upper cap 6, and adapted to surround the lower section of the shaft 8, as shown in Fig. 1. The section of the lower cap 12, adjacent to the projection 4 of the rod 1, is provided with a lateral extension 14, provided with a depression or socket 15, which is adapted to receive the lower and properly formed end of the projection 4, on rod 1. At the same side or section of the lower cap 12 and the extension 14, are provided lateral upper lugs 16, 16, one on each side, so arranged and constructed as to engage and rest on the upper side of the projections 11, 11 of the upper cap 6, as shown in Figs. 1 and 2.

The parts being constructed as herein indicated, the self adjusting bearing is assembled and operates in the following manner: The upper bearing cap 6 is first seated on the upper side of the shaft 8. The lower cap 12 is then placed and adjusted, as to permit the lugs 16, 16, on said lower cap 12, to rest on and engage the projections 11, 11, or the upper bearing cap 6, and raise the lower cap 12, until its bushing 13, is within a small fraction of an inch of the lower side of the shaft 8. Next the connecting rod 1, is so placed that its inner projection 5, rests near the top of the inclined plane surface of the upper projection 9, on the upper cap 6, while the side projection 3, of the rod 1 should be passed between the lugs 10, 10, in the upper cap 6 and bear against the outer side of said cap 6. See Fig. 1. The lower end of the other projection 4, is passed into the socket or depression 15, formed in the lateral extension or jaw 14 of the lower cap 12, and is so adjusted that the inner side of the projection 4 is in contact with the inner wall of the recess or socket 15, while the outer side of the said projection 4, is in contact with the outer wall of the socket 15, as clearly indicated in Fig. 1.

It will be seen from the foregoing construction, arrangement and manner of assembling the parts, by having the lugs 16, 16 of the lower cap 12, rest upon the projections 11, 11, of the upper cap 6, the extension or jaw 14, of the lower cap 12, and projection 4, are brought close to the shaft 8, thus insuring great rigidity and compactness of the bearing, and at the same time serving to keep the caps 6 and 12 from lateral displacement, to assure their correct operative position at all times.

The projection 3, of the rod 1 passing down and between the separated lugs 10, 10, on the upper cap 6, prevents side thrusts or lateral displacement of said rod 1, and insures said rod 1 with its wedge-shaped projection 5, in proper relation with respect to the projection 9, of the upper cap 6, and the projection 4, with the extension 14 and recess 15, of the lower cap 12.

The parts being arranged as above described, should downward pressure be conveyed from the pin 2, through the connecting rod or pitman 1, as by the explosion of an internal combustion engine, said pressure or force will be conveyed to the projection 5, and against the inclined surface of the projection 9, causing the upper cap 6, to turn about the shaft 8, in a counter clockwise direction. The upper cap 6, being connected to the lower cap 12, by means of the engaging projections 11, 11 and lugs 16, 16, the movement of said upper cap 6 will also tend to force or drag the lower cap 12, around the shaft 8, and at the same time toward said shaft 8. However, when the lower cap 12 is drawn against the shaft 8, the upward pull from the points of connection at projections 11, 11, and lugs 16, 16 between the upper cap 6 and lower cap 12, causes a twisting effect and the lateral extension or jaw 14, grips the lower projection 4, of the rod 1, preventing any further motion of said caps 6 and 12 about the shaft 8, and since the upward component of the force is applied at the points of connection between the caps 6 and 12, a greater force is exerted through the jaw 14, or the projection 4, than is exerted by the lower cap 12 on the shaft 8, due to the unequal distance from the point of application of said force, and therefore said cap 12 is forced against the shaft 8 at a relatively light pressure compared to that with which the upper cap 6 is forced down on the shaft 8.

From the foregoing description of operation, it will be seen that relative light pressure is transmitted against the lower section of the shaft 8 by the cap 12, and said cap 12 is firmly locked against downward pressure, because any such pressure will cause the extension or jaw 14 to grip the projection 4, and upward movement is impossible, thereby avoiding the bearing from becoming loose, and locking the same securely together. Any upward movement or pull on the rod 1 from the pin 2, cannot pull or disconnect the rod 1 from the caps 6 and 12 for the reason that the surfaces of the projections 3 and 4, engaging the upper cap 6 and lower cap 12, are not parallel, and hence the caps 6 and 12, and shaft 8, become wedged or pinched between the lower and opposite projections 3 and 4 of the rod 1. Furthermore from the detailed disclosure of construction, assembling and operation of the invention, I have designed a bearing which is particularly adapted for use in internal combustion engines, and will be self adjusting for the reason that the upper cap 6, and lower cap 12, comprising the bearing are automatically drawn toward and around the shaft, and said adjustment ceases when both caps 6 and 12 are resting against the shaft 8, and that said parts are self-adjusting during the upward stroke of the rod. It will also be seen that no bolts are used to secure the several parts, whereby it may be easily assembled or taken apart without wrenches or other tools, the parts also being easily cast and machined, thereby reducing the cost to a minimum.

What I claim is:

1. A self adjusting bearing for connecting rods or pitmen of explosive engines or other motors, comprising a rod having at one end means for engaging a piston and the other end provided with two depending side projections and a projection intermediate the said projections, an upper bearing cap independent of the rod and interposed between the two side projections and having an upper projection adapted to impinge against the intermediate projection of the rod, a lower bearing cap supported at one end from one end of the upper bearing cap and provided at its supported end with an extension or jaw having formed therein a socket or recess to receive the lower end of one of the depending side projections of the rod, said upper and lower bearing caps having oppositely disposed semi-circular curved surfaces so arranged and constructed to surround and receive a crank pin of a shaft.

2. A self adjusting bearing for connecting rods or pitmen of explosive engines or other motors, comprising a rod having at one end means for engaging a piston and the other end provided with two depending side projections and a projection intermediate the said side projections, an upper bearing cap independent of the rod and interposed between the two side projections and having an upper projection adapted to impinge against the intermediate projection of the rod, and two side projections, one on each side of and slidingly engaging one of the two depending side projections on the rod, a lower bearing cap supported at one end from one end of the upper bearing cap and provided at its supported end with an extension or jaw having formed therein a socket or recess to receive the lower end of the other depending side projections of the rod, said upper and lower bearing caps having oppositely disposed semi-circular curved surfaces so arranged and constructed to surround and receive a crank pin of a shaft.

3. A self adjusting bearing for connecting rods or pitmen of explosive engines or other motors, comprising a rod having at one end means for engaging a piston and the other end provided with two depending side projections and a projection intermediate the said projections, an upper bearing cap independent of the rod and having end supporting projections or lugs, and interposed between the two depending side projections of the rod and having an upper projection adapted to impinge against the intermediate projection of the rod, a lower bearing cap having lateral projections or lugs at one end and adapted to engage and be interposed between the supporting projections or lugs of the upper bearing cap and provided at its supported end with an extension or jaw having formed therein a socket or recess to receive the lower end of one of the depending side projections of the rod, said upper and lower bearing caps having inner oppositely disposed semi-circular curved surfaces so arranged and constructed to surround and receive a crank pin of a shaft.

4. A self adjusting bearing for connecting rods or pitmen of explosive engines or other motors, comprising a rod having at one end means for engaging a piston and the other end provided with two depending side projections and a projection intermediate the said side projections, an upper bearing cap independent of the rod and having end supporting lugs or projections, and interposed between the two side depending projections of the rod and having an upper projection adapted to impinge against the intermediate projection of the rod, and two side projections, one on each side of and slidingly engaging one of the two depending side projections on the rod, a lower bearing cap having lateral projections or lugs at one end and adapted to engage and be interposed between the supporting projections or lugs of the upper bearing cap and provided at its supported end with an extension or jaw having formed therein a socket or recess to receive the lower end of the other depending side projections of the rod, said upper and lower bearing caps having inner oppositely disposed semi-circular curved surfaces so arranged and constructed to surround and receive a crank pin of a shaft.

In testimony whereof I affix my signature in presence of two witnesses.

LEWIS M. BROWNING.

Witnesses:
AMY E. DAVIS,
MAUDE M. BROWNING.

Copies of this patent may be obtained for five cents each, by addressing the "Commissioner of Patents, Washington, D. C."